(12) United States Patent
Shah et al.

(10) Patent No.: US 7,962,703 B1
(45) Date of Patent: Jun. 14, 2011

(54) TECHNIQUES FOR IMPROVING DIRTY PAGE LOGGING

(75) Inventors: Dharmesh R. Shah, San Jose, CA (US); Anurag Agarwal, Aundh (IN); Ankur Arora, Maharashtra (IN); Nitin Madan, Maharashtra (IN); Sureshbabu Basavayya, Pashan (IN); Ashish Puri, Maharashtra (IN); Srikanth S. Mahabalarao, Pune (IN); Gurbir Singh Dhaliwal, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 434 days.

(21) Appl. No.: 11/835,777

(22) Filed: Aug. 8, 2007

(51) Int. Cl.
 *G06F 12/00* (2006.01)
(52) U.S. Cl. ...................................... 711/154
(58) Field of Classification Search .................. None
 See application file for complete search history.

(56) References Cited

U.S. PATENT DOCUMENTS

| | | | | |
|---|---|---|---|---|
| 5,440,727 | A * | 8/1995 | Bhide et al. | 711/117 |
| 7,395,278 | B2 * | 7/2008 | Zwilling et al. | 707/200 |
| 2006/0059209 | A1 * | 3/2006 | Lashley | 707/202 |
| 2008/0059726 | A1 * | 3/2008 | Rozas et al. | 711/156 |
| 2009/0037672 | A1 * | 2/2009 | Colbert et al. | 711/154 |

OTHER PUBLICATIONS

Christopher Clark et al.; *Live Migration of Virtual Machines*; USENIX Association; NSDI 2005: 2$^{nd}$ Symposium on Networked Systems Design & Implementation; pp. 273-286.

Mimosa Systems Datasheet; *Mimosa NearPoint for Microsoft Exchange Server*; website printout; www.mimosasystems.com; Dec. 20, 2007; 4 pages.

Mimosa Systems Datasheet; *Mimosa NearPoint eDiscovery Option*; website printout; www.mimosasystems.com; Dec. 20, 2007; 4 pages.

Mimosa Systems Datasheet; *Mimosa NearPoint Disaster Recovery Option*; website printout; www.mimosasystems.com; Dec. 20, 2007; 4 pages.

Mimosa Systems Datasheet; *Mimosa NearPoint PST Archiving Option*; website printout; www.mimosasystems.com; Dec. 20, 2007; 4 pages.

* cited by examiner

*Primary Examiner* — Duc T Doan
(74) *Attorney, Agent, or Firm* — Hunton & Williams LLP

(57) ABSTRACT

Techniques for improving dirty page logging are disclosed. In one particular exemplary embodiment, the techniques may be realized as a method for memory logging comprising the steps of determining for one or more pages of memory if the pages of memory are likely to be modified in a subsequent epoch, performing a first operation on the pages of memory that are likely to be modified in a subsequent epoch, and performing a second operation on the pages of memory that are not likely to be modified in a subsequent epoch, wherein the first operation and the second operation are dissimilar.

19 Claims, 5 Drawing Sheets

TECHNIQUES FOR IMPROVING DIRTY PAGE LOGGING

FIELD OF THE DISCLOSURE

The present disclosure relates generally to memory logging and, more particularly, to techniques for improving dirty page logging.

BACKGROUND OF THE DISCLOSURE

In a virtualized machine environment, one or more virtual machines may operate on a server simultaneously. Memory associated with one or more of the virtual machines may need to be mirrored. For example, a mirrored virtual machine may be useful for fail-over redundancy from one virtual machine to another virtual machine, or may be useful to recreate one or more virtual machines at a particular state or a particular point in time. Mirroring virtual machines may also be useful for debugging purposes.

A checkpointed mirroring process may create a snapshot of memory accessed by a virtual machine during multiple points in time, also known as epochs. An epoch may include a time for processing and a time for creating a checkpoint of the memory at a conclusion of the processing time. Checkpointing memory of a target virtual machine may also be useful for debugging or to create redundancy. It may be inefficient, both in terms of memory used and also in terms of time used, to create a complete copy of each memory page available to a virtual machine during every epoch. A more efficient use of time and memory may be to implement dirty page logging ("DPL").

A DPL system for checkpointing virtual machine memory may check each memory page to see if a page has been modified since a prior epoch. If the page has not been modified, then the DPL system may not mirror the page. If the page has been modified since the last epoch, then the DPL system may create a copy of the memory page for mirroring. In this manner, only pages changed from a prior epoch may be mirrored, so DPL implementation may save memory, while maintaining a complete checkpoint of the state of virtual machine memory at each epoch.

A problem associated with the above-described memory logging technology is that all of the memory may be placed in a read-only state at the beginning of each epoch, and attempts to write to a memory page may create a memory management unit ("MMU") fault. This fault may be generated for the first memory page write attempt to a new memory page in an epoch. At the beginning of a new epoch, all memory pages are again made read-only, and the process may begin again. MMU faults may have an adverse impact on the overall performance of the virtual machine, and on hypervisors and physical servers as well.

In view of the foregoing, it may be understood that there are significant problems and shortcomings associated with current memory logging technologies.

SUMMARY OF THE DISCLOSURE

Techniques for improving dirty page logging are disclosed. In one particular exemplary embodiment, the techniques may be realized as a method for memory logging comprising the steps of determining for one or more pages of memory if the pages of memory are likely to be modified in a subsequent epoch, performing a first operation on the pages of memory that are likely to be modified in a subsequent epoch, and performing a second operation on the pages of memory that are not likely to be modified in a subsequent epoch, wherein the first operation and the second operation are dissimilar.

In accordance with other aspects of this particular exemplary embodiment, the first operation is asynchronous dirty page logging.

In accordance with further aspects of this particular exemplary embodiment, the second operation is synchronous dirty page logging.

In accordance with additional aspects of this particular exemplary embodiment, the determination is made using a probability analysis.

In accordance with further aspects of this particular exemplary embodiment, the probability analysis includes the pages of memory modified in previous epochs.

In accordance with additional aspects of this particular exemplary embodiment, the probability analysis is updated during operation.

In accordance with further aspects of this particular exemplary embodiment, at least one signal embodied in at least one carrier wave for transmitting a computer program of instructions configured to be readable by at least one processor for instructing the at least one processor to execute a computer process for performing the method is provided.

In accordance with additional aspects of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as an apparatus for memory logging comprising an I/O module configured to transmit one or more memory pages, a search module configured to search the one or more memory pages to determine if one or more of the one or more memory pages has been modified over a time period, and a PWWS module configured to determine which of the one or more memory pages may be modified over a time period.

In accordance with other aspects of this particular exemplary embodiment, the I/O module, the search module, and the PWWS module are in communication with each other.

In accordance with further aspects of this particular exemplary embodiment, the I/O module is in communication with one or more memory pages.

In another particular exemplary embodiment, the techniques may be realized as a system for memory logging comprising a module for determining for one or more pages of memory if the pages of memory are likely to be modified in a subsequent epoch, a module for performing a first operation on the pages of memory that are likely to be modified in a subsequent epoch, a module for performing a second operation on the pages of memory that are not likely to be modified in a subsequent epoch, wherein the first operation and the second operation are dissimilar.

In accordance with other aspects of this particular exemplary embodiment, the first operation is asynchronous dirty page logging.

In accordance with further aspects of this particular exemplary embodiment, the second operation is synchronous dirty page logging.

In accordance with additional aspects of this particular exemplary embodiment, the determination is made using a probability analysis.

In accordance with additional aspects of this particular exemplary embodiment, the probability analysis includes the pages of memory modified in previous epochs.

In accordance with further aspects of this particular exemplary embodiment, the probability analysis is updated during operation.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
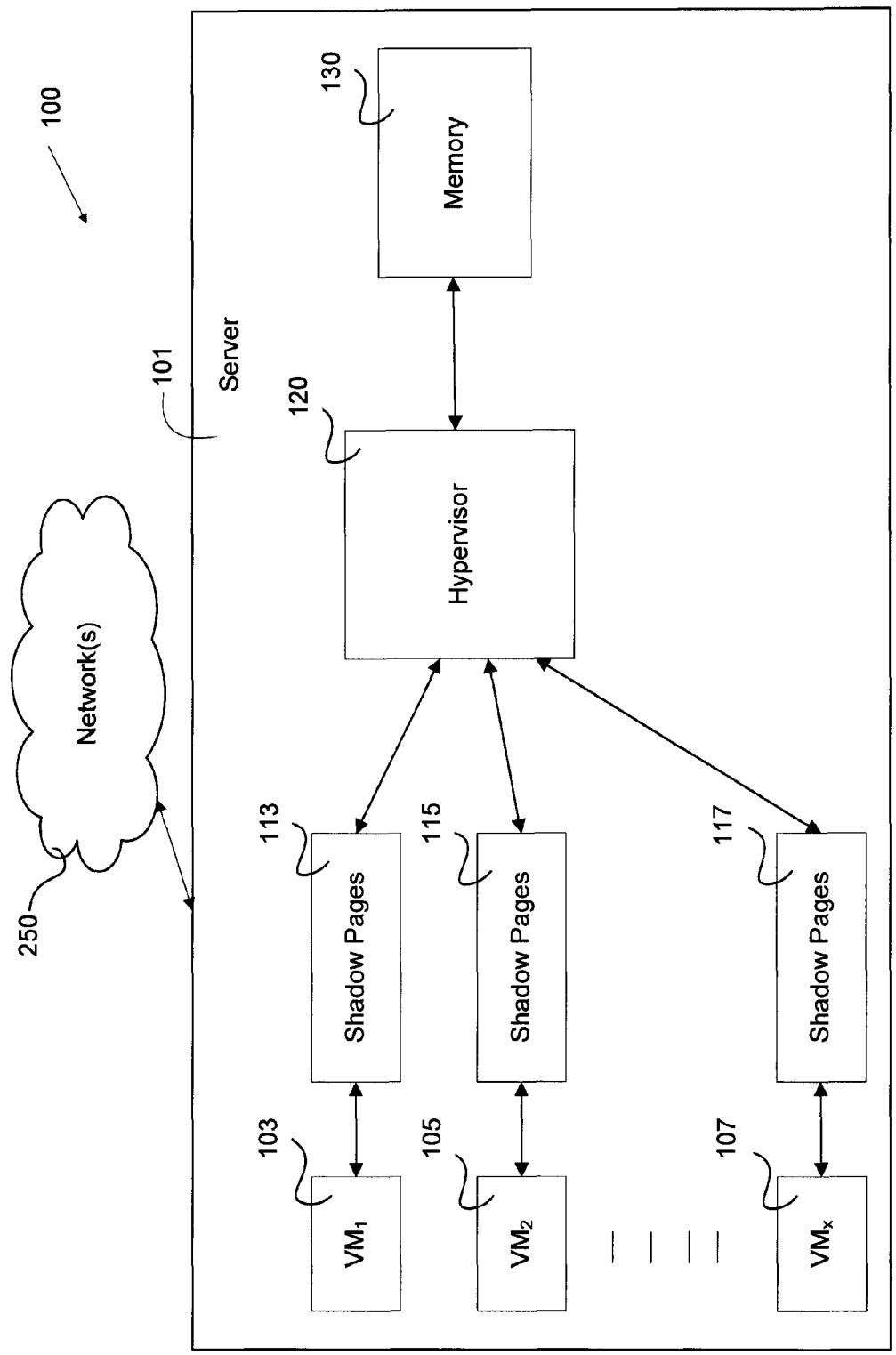
FIG. 1 shows a system comprising a server coupled to one or more networks in accordance with an embodiment of the present disclosure.

Referring to FIG. 1, there is shown a system 100 comprising a server 101 coupled to one or more networks 250 in accordance with an embodiment of the present disclosure. The server 101 may be a physical machine, for example a computer, or may be a cluster of physical machines. The server 101 may contain, for example, one or more processors for carrying out instructions, and may include memory to store and recall information. The server 101 may also include input devices for creating input into the system 100, and output devices for transmitting data. The server 101 may operate to execute code.

In accordance with the embodiment of FIG. 1, the server 101 may comprise a plurality of virtual machines (VM) 103-107, a hypervisor 120, and a memory 130. The memory 130 may comprise, but is not limited to, Random-access memory ("RAM"). The memory 130 may also be associated with, for example, a magnetic hard drive, optical storage, or a tape drive. The memory 130 may be used by the server 101 to store and recall data.

Within the server 101, the plurality of virtual machines (VM) 103-107 may be instantiated. For example, within the server 101, VM1 103, VM2 105, up to VMx 107 may be instantiated. While FIG. 1 shows three virtual machines (VM) 103-107, the server 101 may include any number of virtual machines. Each virtual machine (VM) 103-107 may appear to be a physical server 101, but instead may be instantiated on a physical server 101. Each virtual machine (VM) 103-107 may appear to receive data from one or more inputs, produce data through one or more outputs, have addressable memory and persistent storage for storing and retrieving data, and be in communication with the one or more networks 250.

Each network 250 may include, but is not limited to, for example, a wide area network ("WAN"), a local area network ("LAN"), a global network such as the Internet, a telephone network such as a public switch telephone network, a wireless communication network, a cellular network, an intranet, or the like, or any combination thereof. Also, each network 250 may be used so that components of the present disclosure may be in communication with one another. In exemplary embodiments of the present disclosure, each network 250 may include one or any number of the exemplary types of networks mentioned above operating as a stand-alone network or in cooperation with each other. Use of the term network herein is not intended to limit the one or more networks 250 to a single network.

The hypervisor 120 may be executing code that may be operable to create and maintain the plurality of virtual machines (VM) 103-107. That is, the virtual machines (VM) 103-107 may use a shadow page table system to address the memory 130 associated with the server 101. The hypervisor 120 may include one or more shadow page tables for each virtual machine instantiation, so virtual machine VM1 103 may be associated with shadow page tables 113, VM2 105 may be associated with shadow page tables 115, and VMx 107 may be associated with shadow page tables 117. For example, code running on the virtual machine may wish to modify memory page1 contained within memory 130. If all virtual machines had direct access to page1, page1 may be modified by all of the virtual machines, each virtual machine overwriting page1. Shadow page tables may be used to allocate the server's memory 130 into individual partitions for each virtual machine. Shadow page tables may be a logical copy of each virtual machine's memory page tables, but the shadow page tables may be maintained by the hypervisor 120.

Figure 2:
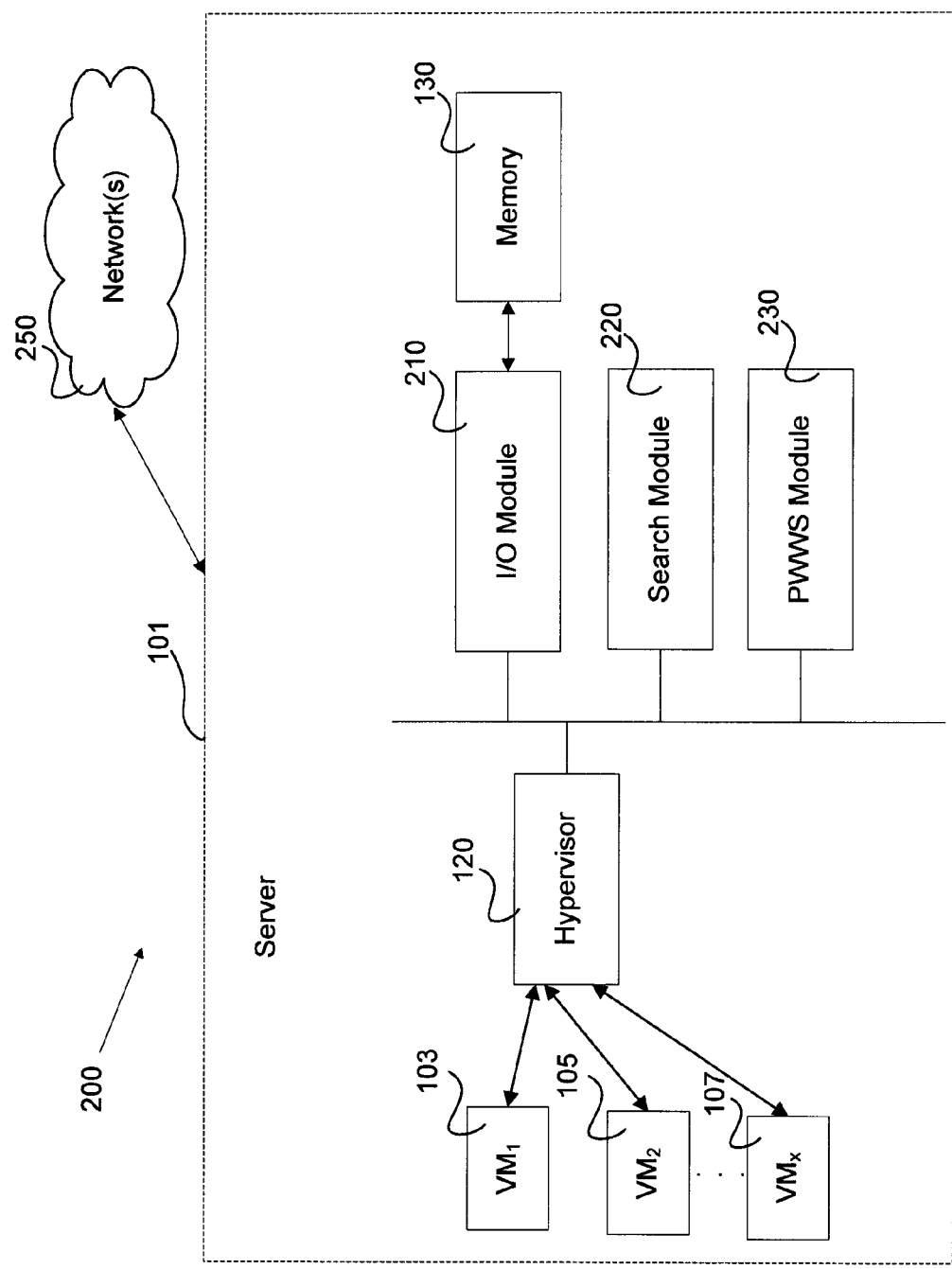
FIG. 2 shows a system comprising a server with memory logging modules in accordance with an embodiment of the present disclosure.

Turning now to FIG. 2, there is shown a system comprising the server 101 with memory logging modules in accordance with an alternative embodiment of the present disclosure. The server 101 may comprise an input/output ("I/O") module 210, a search module 220, a Predicted Writable Working Set ("PWWS") module 230, and the hypervisor module 120. Each module may interact with the other modules. In one embodiment, the modules may be contained within one physical system, but this is not necessary. In another embodiment, one or more modules may be placed on one or more physical systems, for example on one or more computers. The one or more computers, and the one or more modules which may reside on the one or more computers, may be in communication via a network. Each module will be explained in more detail below.

The I/O module 210 may be operable to read input from one or more input devices and write output to one or more output devices. For example, the I/O module 210 may transmit write requests to the memory 130, and may also transmit read requests to the memory 130. The I/O module 210 may be in communication with memory or storage associated with the server 101, and may be in communication with the search module 220, so that data blocks and/or memory pages modified by the one or more of the virtual machines may be communicated to the memory or storage associated with the system 101 and also with the search module 220 or the PWWS module 230, or both.

The search module 220 may be operable to search one or more memory pages to determine if each of the one or more memory pages has been modified either before or during an epoch. The search module 220 may be in communication with the hypervisor 120 and/or I/O module 210 to determine if one or more memory pages have been modified. The search module 220 may also be in communication with the PWWS module 230 to determine search requirements for one or more of the one or more memory pages.

The PWWS module 230 may be operable to determine if one or more of the one or more memory pages may be likely to be modified in the future. The determination may take place in one or more different ways, as described more fully below.

The hypervisor 120 module may be operable to create and maintain one or more virtual machines. The hypervisor 120 may be in communication with the I/O module 210 and the memory to create one or more shadow page tables for the one or more virtual machines. The virtual machines may interact with the server 101 and the other modules via the hypervisor 120, and may be able to request information stored at memory addresses and may be able to create write requests to the memory via the hypervisor 120.

Dirty Page Logging ("DPL") is a feature that may be used in virtual machine environments, and may be used to detect incremental changes to a virtual machine's memory state. One or more of the virtual machines may have a mirror of the memory to which the virtual machine has access. This may be done for a variety of reasons, including creating the ability to create another virtual machine with the same configuration as a target virtual machine. The server 101 may implement DPL to create an efficient mechanism by which to mirror a target virtual machine's addressable memory. This may be accomplished using DPL because DPL may checkpoint only incremental changes at the end of each epoch. DPL may be used in a synchronous implementation and an asynchronous implementation. Both implementations are described more fully below.

Figure 3:
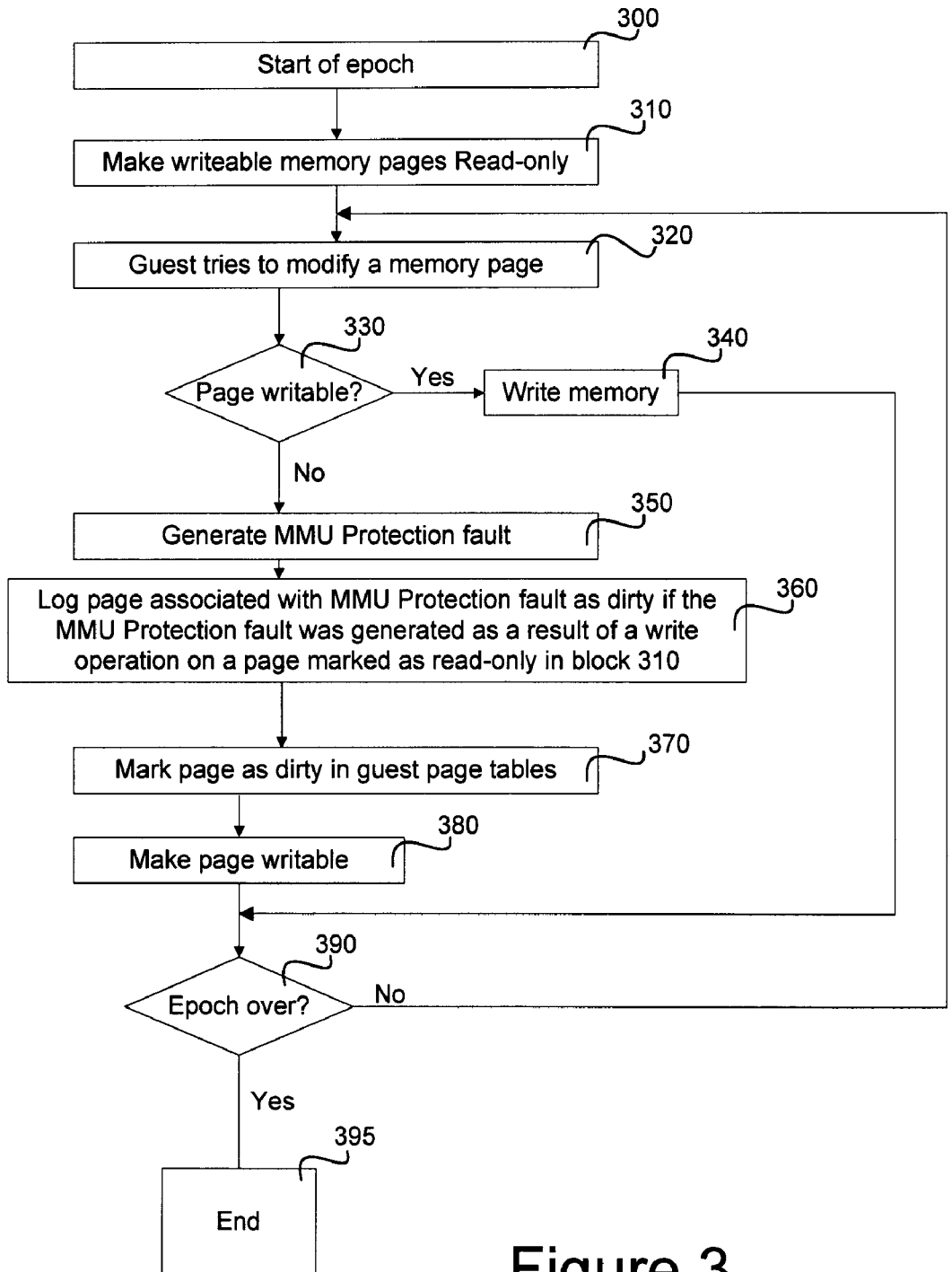
FIG. 3 shows a flow chart of synchronous dirty page logging in accordance with an embodiment of the present disclosure.

Turning now to FIG. 3, a flow chart of synchronous dirty page logging is shown in accordance with an embodiment of the present disclosure. As shown in block 300, the beginning of the flow chart may mark the beginning of an epoch. As shown in block 310, the hypervisor 120 may mark some or all writable memory pages as read-only. The hypervisor 120 may accomplish this by, for example, setting memory pages in a shadow page table for a target virtual machine to be read only. As shown in block 320, a guest or virtual machine may attempt to write to a memory page which was previously set as read-only. A determination may be made if the memory page is writable in block 330. If the memory page is writable, it may have been modified in the current epoch, and so the memory page has been set to be writable. If the memory page is writable, then the memory page may be written to, as shown in block 340, and the generation of a MMU protection fault may be skipped for the particular memory page. If the memory page is not writable, then the hypervisor 120 (or another system processor) may generate an MMU protection fault, as shown in block 350. When the hypervisor 120 receives communication of an MMU protection fault, the hypervisor 120 may mark the memory page associated with the MMU protection fault as dirty, meaning that the memory page may have been modified since the previous epoch, as shown in block 360. The hypervisor 120 may mark the memory page associated with the MMU protection fault as dirty if the MMU protection fault was generated by setting the pages as read-only in block 310. If an MMU protection fault is generated for some other reason, the hypervisor 120 or system 110 may process the error according to error handling protocols. The hypervisor 120 may also mark the memory page as dirty in memory page tables of the virtual machine, as shown in block 370. After the memory page is marked as dirty, the memory page may be switched from read-only to writable, as shown in block 380. Further writes to the particular memory page set as writable in block 380 may not create an MMU protection fault, as the memory page may already be writable and MMU protection faults may be created by an attempt to write a memory page set as read-only. If the epoch has not concluded, as shown in block 390, the target virtual machine may be monitored for more attempted memory page writes. If the epoch has concluded, the method may end in block 395 and may begin again at a new epoch. This method of synchronous dirty page logging may allow the hypervisor 120 to create a list of memory pages that have been modified during an epoch, but MMU protection faults generated for an attempt to write to a read-only memory page may degrade the performance of the virtual machine or the server 101 in general.

Figure 4:
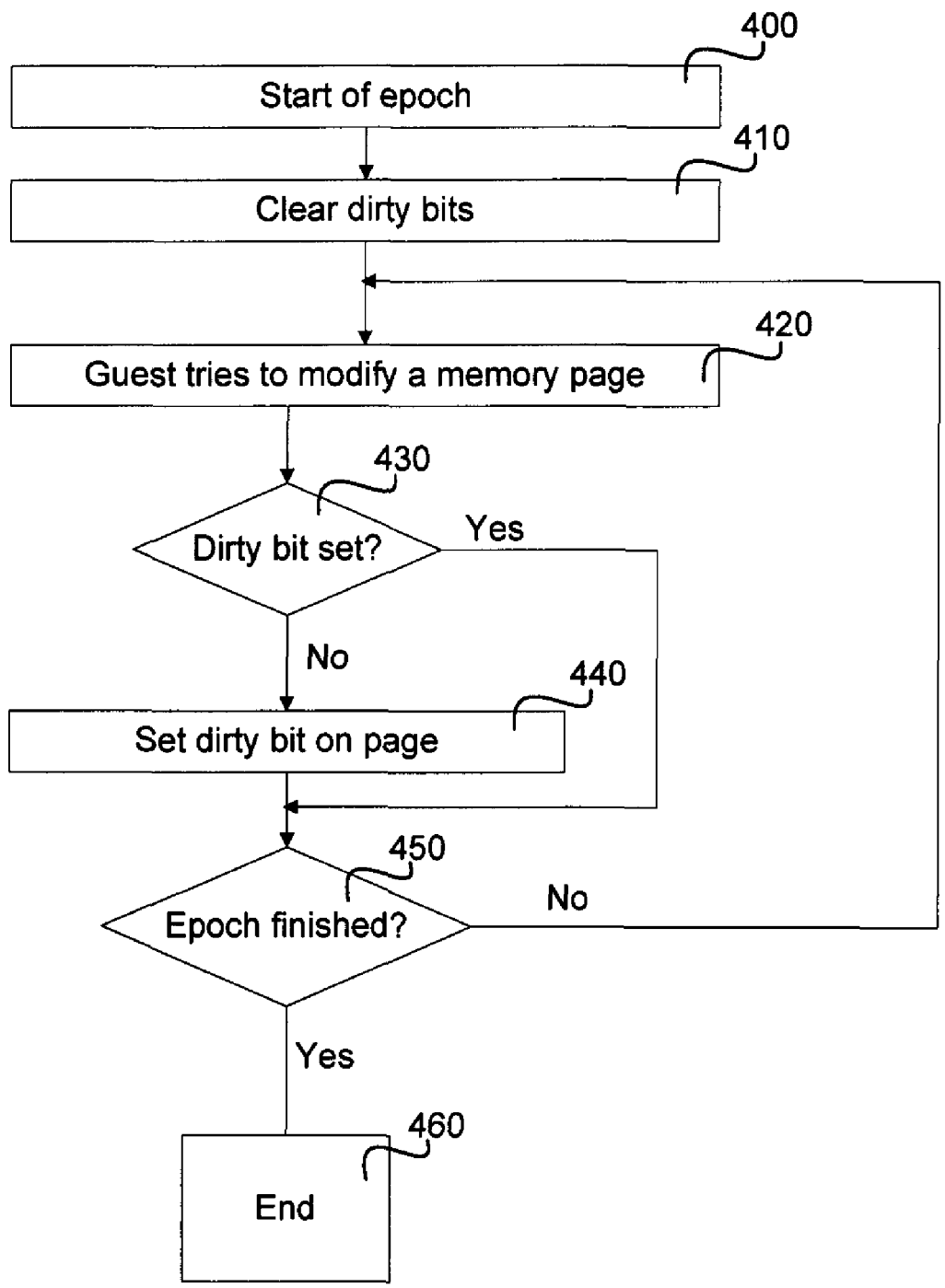
FIG. 4 shows a flow chart of asynchronous dirty page logging in accordance with another embodiment of the present disclosure.

Turning now to FIG. 4, a flow chart of asynchronous dirty page logging is shown in accordance with an embodiment of the present disclosure. As shown in block 400, the beginning of the flow chart may mark the beginning of an epoch. Each memory page may have associated with it a dirty bit in the corresponding page table entry of the corresponding shadow page table, which may be either clear or not clear. As shown in block 410, the hypervisor 120 or a processor associated with the server 101 may clear dirty bits in the shadow page table entries associated with some or all memory pages available to a particular virtual machine. As shown in block 420, a guest or particular virtual machine may attempt to write to a memory page. As shown in block 430, the hypervisor 120 or a processor associated with the server 101 may then determine if a dirty bit associated with the memory page that the virtual server 101 is attempting to write to is clear or not clear. If the dirty bit is clear or not set, then the hypervisor 120 or the server 101 may set the dirty bit associated with the memory page, as shown in block 440. If the dirty bit associated with the memory page is set already, then the memory page may have been previously modified. If a determination is made that the epoch has not concluded, as shown in block 450, the target virtual machine may be monitored for more attempted memory page writes. If the epoch has concluded, the method may end at block 460 and may begin again at a new epoch. This method of asynchronous dirty page logging may not create MMU protection faults for page write attempts, but the hypervisor 120 may not have a list of the memory pages modified during an epoch. The hypervisor 120 may then search through all of the corresponding shadow page tables for the memory available to the virtual machine, searching for memory pages with set dirty bits.

The PWWS module 230 may be operable to identify and create a set of one or more memory pages which are more or less likely to be modified in a current or future epochs. Memory page access may tend to be localized across small time scales. For example, if a virtual machine modifies a first memory page during a first epoch, then the virtual machine may modify the first memory page during a second epoch, if the second epoch is the next epoch after the first epoch. The set of pages that were modified during the first epoch may be used to determine which pages may be modified during the second epoch. The set of pages that may be modified during the second or later epochs may change across subsequent epochs. The PWWS module 230 may use a probability analysis to determine which pages are likely to be modified. The probability analysis may be accomplished using one or more metrics. The probability analysis may also be tuned so that more or fewer pages are identified as likely to be modified from one epoch to the next epoch. Such tuning may occur during operation of the server 101 and hypervisor 120. Over successive epochs, some memory pages may be added to the set of pages, and some memory pages may be removed from the set of pages that are likely to be modified.

Figure 5:
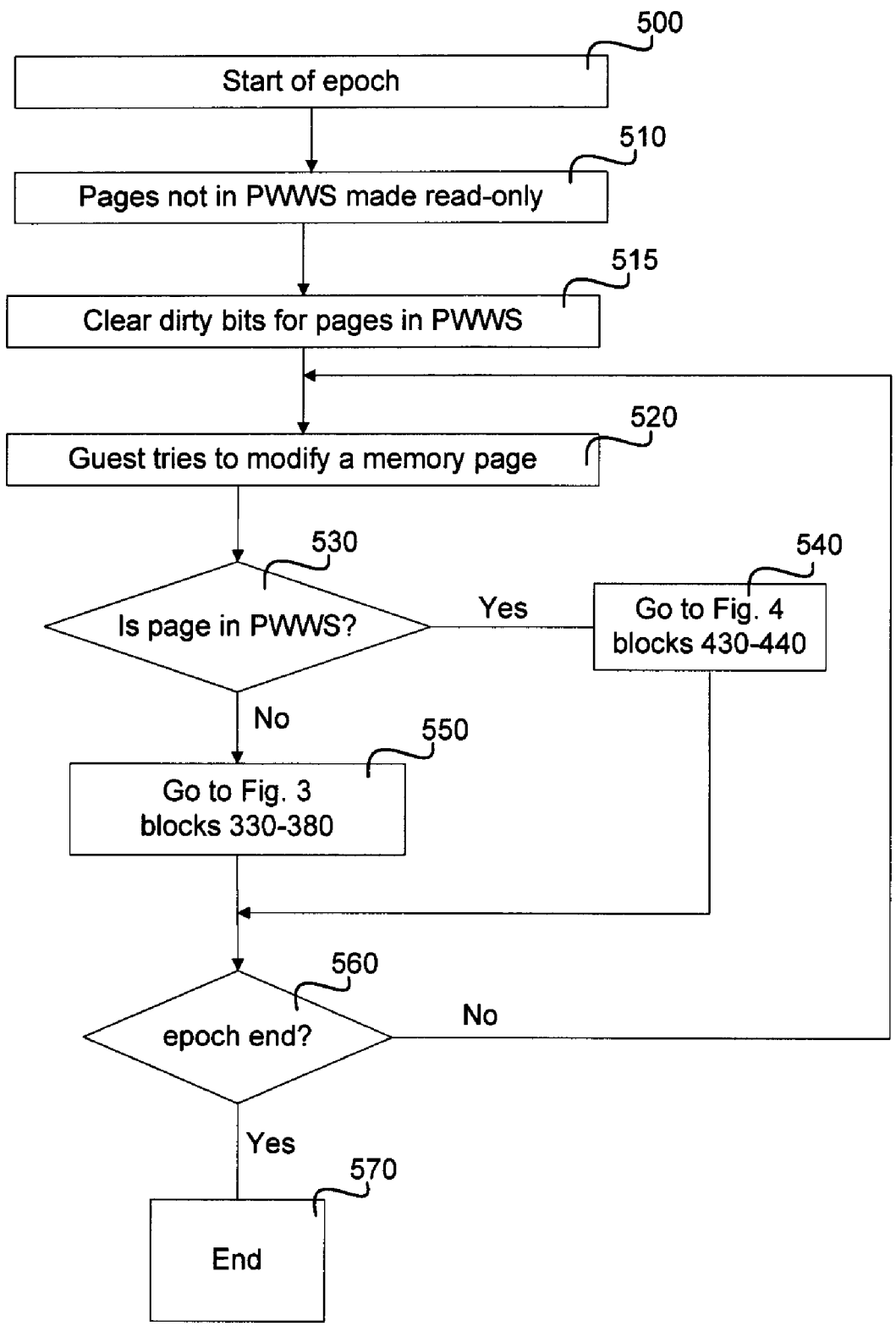
FIG. 5 shows a flow chart of synchronous and asynchronous dirty page logging using a predicted writable working set of memory in accordance with an embodiment of the present disclosure.

Turning now to FIG. 5, a flow chart of synchronous and asynchronous dirty page logging using a predicted writable working set ("PWWS") of memory is shown in accordance with an embodiment of the present disclosure. The flow chart may include elements of both synchronous and asynchronous dirty page logging, in conjunction with the PWWS module 230 and the set of memory pages likely to be modified. As shown in block 500, the beginning of the flow chart may mark the beginning of an epoch. As shown in blocks 510 and 515, the hypervisor 120 or the server 101, working with the PWWS module 230, may use a set of memory pages that are likely to be modified in order to determine whether to use synchronous or asynchronous dirty page logging. Pages that are not contained within the PWWS set may be set to be read-only, as shown in block 510. As shown in block 515, the hypervisor 120 or the server 101 may clear dirty bits associated with some or all of the memory pages available to a particular virtual machine and that may be contained within the PWWS set. As shown in block 520, a guest or particular virtual machine may attempt to write to a memory page. As shown in block 530, the hypervisor 120 or the server 101 in conjunction with the PWWS module 230, may then determine if the particular memory page is contained within the PWWS set. If the memory page is contained within the PWWS set, a MMU protection fault may not be generated, and then the memory page may be logged according to asynchronous dirty page logging according to blocks 430 and 440 in FIG. 4, as shown in block 540 of FIG. 5. If the memory page is not contained within the PWWS set, then the memory page may be logged according to synchronous dirty page logging according to blocks 330, 340, 350, 360, 370, and 380 of FIG. 3, as shown in block 550 of FIG. 5. If a determination is made that the epoch has not concluded, as shown in block 560, the target virtual machine may be monitored for more attempted memory page writes. If the epoch has concluded, the method may end at block 570 and may begin again at a new epoch.

At this point it should be noted that the systems and techniques in accordance with the present disclosure as described above typically involves the processing of input data and the generation of output data to some extent. This input data processing and output data generation may be implemented in hardware or software. For example, specific electronic components may be employed in a computer system or similar or related circuitry for implementing the functions associated with memory page logging in accordance with the present disclosure as described above. Alternatively, one or more processors operating in accordance with stored instructions may implement the functions associated with memory page logging in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for memory logging comprising the steps of:
   determining, for one or more pages of memory, if the one or more pages of memory are likely to be modified at a future point in time based at least in part upon whether the one or more pages of memory were modified at least one previous point in time;
   performing a first dirty page logging operation on the one or more pages of memory that are likely to be modified at a future point in time, wherein the first dirty page logging operation is an asynchronous dirty page logging operation that determines for at least one of the one or more pages of memory if a dirty bit associated with the at least one memory page has been set in a page table; and
   performing a second dirty page logging operation on the one or more pages of memory that are not likely to be modified at a future point in time, wherein the second dirty page logging operation is a synchronous dirty page logging operation that determines for at least one of the one or more pages of memory if the at least one memory page is writable;
   wherein the first dirty page logging operation and the second dirty page logging operation are dissimilar dirty page logging operations for logging only incremental changes to the one or more pages of memory.

2. The method according to claim 1, further comprising setting as read-only the one or more pages of memory that are not likely to be modified at a future point in time.

3. The method according to claim 1, further comprising clearing the dirty bit associated with the at least one memory page.

4. The method according to claim 1, wherein the determination is made using a probability analysis.

5. The method according to claim 4, wherein the probability analysis includes at least one page of memory that was modified at least one previous point in time.

6. The method according to claim 4, wherein the probability analysis is updated during operation.

7. At least one non-transitory processor readable storage medium storing a computer program of instructions configured to be readable by at least one processor for instructing the at least one processor to execute a computer process for performing the method as recited in claim 1.

8. The method according to claim 1, wherein both the first dirty page logging operation and the second dirty page logging operation comprise changing one or more bits associated with the one or more memory pages in a memory page table if the one or more memory pages may have been modified or if an attempt has been made to modify the one or more memory pages at least one previous point in time.

9. An apparatus for memory logging comprising:
   an I/O module configured to transmit one or more memory pages;

a search module configured to search the one or more memory pages to determine if one or more of the one or more memory pages has been modified at least one previous point in time;

a Predicted Writable Working Set ("PWWS") module configured to determine which of the one or more memory pages may be modified at a future point in time based at least in part upon whether at least one of the one or more memory pages were modified at least one previous point in time; and a server configured to perform dirty page logging operations on the one or more pages of memory, wherein a first dirty page logging operation is an asynchronous dirty page logging operation that determines for at least one of the one or more pages of memory if a dirty bit associated with the at least one memory page has been set in a page table, wherein a second dirty page logging operation is a synchronous dirty page logging operation that determines for at least one of the one or more pages of memory if the at least one memory page is writable.

10. The apparatus according to claim 9, wherein the I/O module, the search module, and the PWWS module are in communication with each other.

11. The apparatus according to claim 9, wherein the I/O module is in communication with the one or more memory pages.

12. The apparatus according to claim 9, wherein:
the first dirty page logging operation is performed on the one or more memory pages that are likely to be modified at a future point in time; and
the second dirty page logging operation is performed on the one or more pages of memory that are not likely to be modified at a future point in time;
wherein the first dirty page logging operation and the second dirty page logging operation are dissimilar dirty page logging operations for logging only incremental changes to the one or more pages of memory.

13. A system for memory logging comprising:
a module, executed by a processor, for determining for one or more pages of electronic memory if the one or more pages of electronic memory are likely to be modified at a future point in time based at least in part upon whether the one or more pages of electronic memory were modified at least one previous point in time;

a module for performing a first dirty page logging operation on the one or more pages of electronic memory that are likely to be modified at a future point in time, wherein the first dirty page logging operation is an asynchronous dirty page logging operation that determines for at least one of the one or more pages of electronic memory if a dirty bit associated with the at least one memory page has been set in a page table; and a module for performing a second dirty page logging operation on the one or more pages of electronic memory that are not likely to be modified at a future point in time, wherein the second dirty page logging operation is a synchronous dirty page logging operation that determines for at least one of the one or more pages of electronic memory if the at least one memory page is writable;

wherein the first dirty page logging operation and the second dirty page logging operation are dissimilar dirty page logging operations for logging only incremental changes to the one or more pages of electronic memory.

14. The system according to claim 13, further comprising a module for setting as read-only the one or more pages of memory that are not likely to be modified at a future point in time.

15. The system according to claim 13, further comprising a module for clearing the dirty bit associated with the at least one memory page.

16. The system according to claim 13, wherein the determination is made using a probability analysis.

17. The system according to claim 16, wherein the probability analysis includes at least one page of electronic memory that was modified at least one previous point in time.

18. The system according to claim 16, wherein the probability analysis is updated during system operation.

19. The system according to claim 13, wherein both the first dirty page logging operation and the second dirty page logging operation comprise changing one or more bits associated with the one or more pages of electronic memory in a memory page table if the one or more pages of electronic memory may have been modified or if an attempt has been made to modify the one or more pages of electronic memory at least one previous point in time.

* * * * *